Dec. 31, 1968 R. A. WALKER 3,419,058
SET SCREW
Filed Dec. 16, 1966
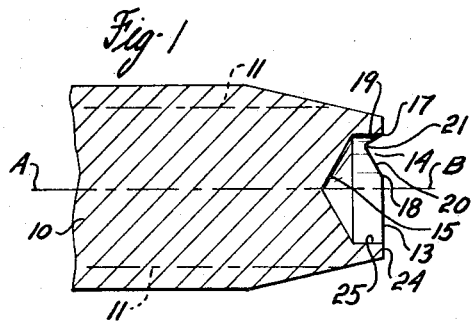
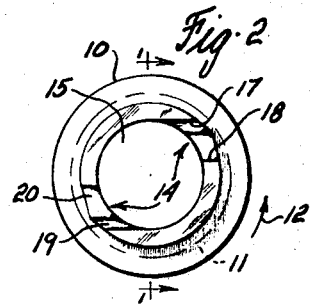
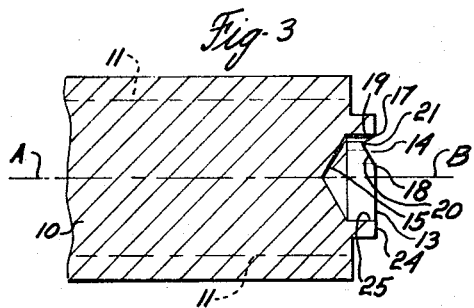
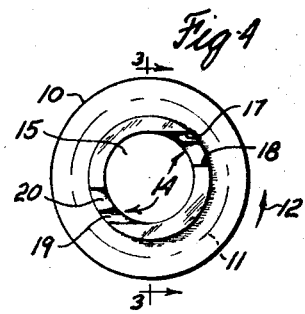
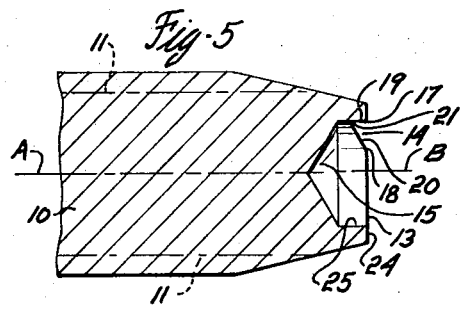
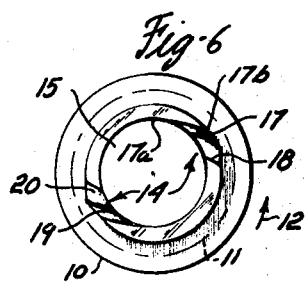
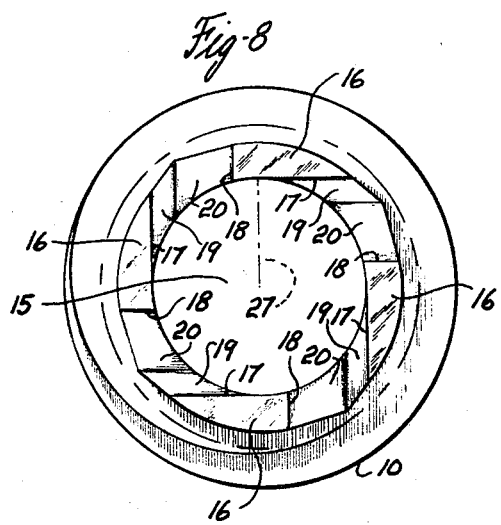
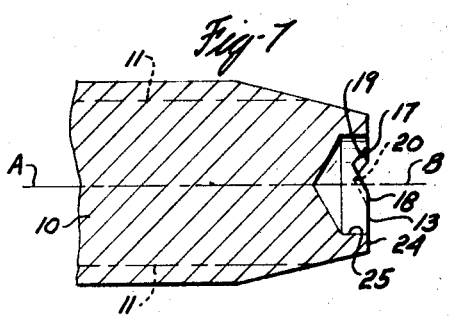
INVENTOR.
Richard A. Walker
BY
Synnestvedt & Lechner
ATTORNEYS United States Patent Office 3,419,058
Patented Dec. 31, 1968

3,419,058
SET SCREW
Richard A. Walker, Warrington, Pa., assignor to Standard Pressed Steel Co., Jenkintown, Pa., a corporation of Pennsylvania
Filed Dec. 16, 1966, Ser. No. 602,205
6 Claims. (Cl. 151—70)

ABSTRACT OF THE DISCLOSURE

A cup point set screw having a plurality of transverse tooth cuts through its point wall edge into the cup wherein each tooth has its leading tooth cut edge tangent to a radius of the cup and its trailing tooth cut edge intersecting the cup at a point approximately 90° from the point of tangency of the leading tooth cut edge. As a result, the length differential of the leading and trailing tooth cut edges is maximized to provide a large resistance against loosening of the set screw and little resistance to seating of the set screw.

This invention relates to an improvement in cup point set screws that serves to greatly enhance the resistance of the screw to vibration, to increase its axial holding power and provide a high level of torsional holding power.

The improved set screw of the invention is a cup point set screw having a plurality of teeth formed in the point edge by transverse tooth cuts through the point wall edge into the cup and wherein relative to seating rotation about the screw axis and as to a given tooth forming cut, the leading cut edge intercept with the point edge is wider than the trailing cut edge intercept with the point edge.

Various embodiments of the invention are illustrated in FIGURES 1-8 in which:

FIGURES 1, 3 and 5 are side sectional views of set screws made in accordance with this invention.

FIGURES 2 and 4 are end views (looking at the point end) of the set screws of FIGURES 1 and 3 respectively.

FIGURE 5 is a side sectional view of a set screw similar to that shown in FIGURE 1, but showing a modified tooth forming cut.

FIGURE 6 is an end view (looking at the point) of a set screw similar to FIGURE 4 but showing still another modified tooth forming cut.

FIGURE 7 illustrates the set screw of FIGURE 1 but rotated 30° clockwise about the screw axis.

FIGURE 8 is an enlarged end view (looking at the point end of the set screw) of a preferred embodiment of the invention.

In the various figures, the same reference numeral will be used to indicate the same feature even though applied to the different embodiments.

Referring to FIGURES 1-7 there is shown a set screw 10, the minor diameter of the threading is schematically illustrated by the dotted lines 11. These screws are provided with conventional driving surfaces (not shown) for applying torque about the screw axis A-B for seating and unseating the screw. The directional arrows 12 in FIGURES 2, 4 and 6 show the direction in which the screw is to be rotated in order to engage and bear against a shaft or other workpiece, i.e., the direction of seating rotation.

In the point edge 13 of the set screw there are a series of transversely extending tooth cuts 14 through the outermost point wall edge into the cup 15 that form a plurality of "teeth" 16 (best seen in FIGURE 8). Preferably the tooth cuts are symmetrical and are equiangularly disposed about the screw axis. When considering a given tooth cut, relative to seating rotation, the leading tooth cut edge 17, at the intercept of the cut edge with the edge of the screw point is wider than the tooth cut edge 18 at the intercept of the cut edge with the point edge.

The tooth cuts can be of any desired configuration provided it will generate the aforesaid width relationship as between its leading and trailing edges at the point intercept. Thus, the cuts can be straight line cuts as shown in FIGURES 2 and 4 or the cut can be curved as shown in FIGURE 6. A preferred embodiment employs V-shaped tooth cuts through the point wall edge and especially those in which the leading tooth cut face 19 is more steeply inclined to the leading edge of the cup point than its trailing tooth cut face 20. Maximum resistance to unseating will be developed when the face formed by the face 19 is perpendicular to the plane of the point edge as shown in FIGURE 5 and excellent results have been obtained where the tooth cut is 60°/30° right triangle with the right angle forming the tooth cut root 21, the leading tooth cut sides 19 being opposite the 30° angle.

From the standpoint of maximum enhancement of vibration resistance, such benefits are obtained with set screws in which the screw point end 13 has substantially flat annular surface 24 (FIGURES 1, 3, 5 and 7) that is capable of plastically deforming the engaged shaft or workpiece and the annulus is interrupted by the tooth cuts. The plane of the point end is perpendicular to the screw axis. The point end is counterbored 25 to form the cup. The counterbore 25 is a cylindrical surface coaxial with the screw axis and is significantly of a radius smaller than that of the screw point end so as to form the annulus. The counterbore 25 extends into the screw body beyond the tooth cut root 21. As can best be seen in FIGURE 8, and for a given tooth cut, the leading edge 17 (relative to seating rotation) extends outwardly from the wall edge of the counterbore on a line that is tangent to the cut counterbore radius 27. When the leading edge 17 (relative to seating rotation) is other than a straight tangential line, for example as the curved cut shown in FIGURE 6, it is preferred that the innermost edge portions 17a precede (in the direction of seating rotation) the outermost edge portions 17b.

In the embodiment illustrated in FIGURE 6, the leading edge 17 of the tooth cut is tangent to the counterbore at its innermost portion 17a and the leading edge 17 is formed by a curve swung from a center lying on an extended reverse radius to the point of tangency, and the radius of the arc is considerably larger than the counterbore radius so that the edge portion 17a will "precede" edge portion 17b.

It is also possible to make the tooth cuts so that the leading edge 17 is not tangent at any point to the counterbore radius. However, the leading and trailing edges of the tooth cut should not be aligned equidistant from a counterbore radius. If the cut straddles a counterbore radius, the leading edge should be offset from the radius more than the trailing edge; and the leading edge should not lie on a counterbore radius. While this arrangement exhibits some improvement in vibration resistance over conventional set screws, the improvement is not as great as that obtained with the embodiments in FIGURES 1 to 8 because the width differential of the leading and trailing edges are not sufficiently great. Preferably, the leading tooth cut edge 17 should be as great as possible, in this way the resistance to seating is minimized and the unseating resistance is maximized.

In vibration life tests carried out with several different conventional types of cup point set screws that did not have the tooth configuration and with set screws made in accordance with the invention (all on 5/16–18 set screws tightened to 160 inch-pounds seating torque), the conventional set screws failed within from 2–9 minutes, whereas with set screws made in accordance with the invention, from 15–60 minutes elapsed before failures occurred.

The four toothed embodiment of FIGURE 8 applied to a set screw having frusto-conical tip such as shown in FIGURE 1 gave the best results than a three toothed embodiment. Further, the more rigid and massive frusto-conical tip of FIGURE 1 gave somewhat better results than the half-dog tip of FIGURE 3—both having the same number of teeth. The number of teeth can vary from 2 to 5. However, the preferred design is one that will fully seat on the application of somewhat less than about 90° rotation after initial contact with the shaft or workpiece; and in such arrangements the number of teeth should not exceed four in order to avoid "smearing" in the bite by a succeeding tooth running into the zone deformed by the preceding tooth.

I claim:

1. A cup point set screw having an annular point end including a wall and an edge and a plurality of V-shaped teeth formed in the point edge by transverse tooth cuts through the point wall edge into the cup and wherein relative to seating rotation about the screw axis and as to a given tooth forming cut, the leading tooth cut face is more steeply inclined to the edge of the cup point than the trailing tooth cut face, the leading cut edge intercept with the point edge is at its innermost portion tangent to a radius of the cup and wider than the trailing cut edge intercept with the point edge which intersects the cup at a point approximately 90° from the point of tangency of the leading cut edge intercept and the radius of the cup.

2. A set screw according to claim 1 wherein the leading and trailing tooth cut edges are straight lines which are parallel to each other.

3. A set screw according to claim 1 wherein the plane of the point end of the set screw is perpendicular to the screw axis.

4. A set screw according to claim 3 wherein the cup extends into the screw body beyond the tooth cut roots.

5. A set screw according to claim 3 having four symmetrical and equiangularly disposed tooth cuts.

6. A set screw according to claim 3 wherein the outer surface of the screw point is a frusto-conical section.

References Cited

UNITED STATES PATENTS

| | | | |
|---|---|---|---|
| 1,330,792 | 2/1920 | Frick | 85—155 |
| 1,355,373 | 10/1920 | White | 151—37 |
| 2,462,910 | 3/1949 | Simmons | 151—70 |

FOREIGN PATENTS

| | | |
|---|---|---|
| 648,504 | 1/1951 | Great Britain. |

EDWARD C. ALLEN, *Primary Examiner.*